United States Patent [19]

Watanabe et al.

[11] 4,411,807
[45] Oct. 25, 1983

[54] DRY PROCESS FOR THE PRODUCTION OF HEXAGONAL-SYSTEM FERRITE

[75] Inventors: Yasuo Watanabe; Seiji Isoyama; Masahiko Bannou, all of Okayama, Japan

[73] Assignee: Dowa Mining Co., Ltd., Tokyo, Japan

[21] Appl. No.: 387,654

[22] Filed: Jun. 11, 1982

Related U.S. Application Data

[63] Continuation of Ser. No. 152,428, May 22, 1980, abandoned.

[30] Foreign Application Priority Data

Jun. 8, 1979 [JP] Japan ................................ 54-72098

[51] Int. Cl.$^3$ ............................................. C04B 35/26
[52] U.S. Cl. ................................ 252/62.58; 252/62.6; 252/62.63; 423/594
[58] Field of Search ................ 252/62.58, 62.6, 62.63; 423/594

[56] References Cited

U.S. PATENT DOCUMENTS 3,804,767 4/1974 Tombs ........................... 423/594 X
4,116,752 9/1978 Matsumoto et al. ........... 423/594 X
4,259,197 3/1981 Boeuf et al. ..................... 252/62.58

FOREIGN PATENT DOCUMENTS 284335 4/1966 Australia ............................ 423/594
1955611 6/1970 Fed. Rep. of Germany ... 252/62.58
2428004 1/1975 Fed. Rep. of Germany ...... 423/594

Primary Examiner—Jack Cooper
Attorney, Agent, or Firm—Browdy & Neimark

[57] ABSTRACT

There is disclosed a novel dry process for the production of hexagonal-system ferrite having the formula: $MO \cdot nFe_2O_3$, wherein n represents a real number of 5.1–5.8 and M represents at least one metallic element selected from the group consisting of Ba, Sr and Pb. The ferrite is baked in the presence of the mixed additive comprising X-agent selected from the group consisting of KCl, NaCl and LiCl; and Y-agent selected from the group consisting of $KBO_2$, $NaBO_2$ and $LiBO_2$ and/or the group consisting of $K_2CO_3$, $Na_2CO_3$ and $Li_2CO_3$. After baking, the mixed additive is completely removed from the resulting ferrite by washing or by a wet-process disintegrating treatment. By changing the mixing ratio of said X-agent to said Y-agent, ferrite crystals having various characteristic properties can be obtained.

10 Claims, 3 Drawing Figures

DRY PROCESS FOR THE PRODUCTION OF HEXAGONAL-SYSTEM FERRITE

This is a continuation of application Ser. No. 152,428 filed May 22, 1980 now abandoned.

This invention relates to a process for the production of hexagonal-system ferrite having the generic formula: $MO.6Fe_2O_3$ wherein M represents one member or a combination of two or more selected from the group consisting of Ba, Sr and Pb, said ferrite comprising crystal particles in the shape of hexagonal flat plates, having a relatively even particle size and having a rather narrow particle size distribution, the ferrite being useful for preparing a variety of magnetic, ferrite-containing composite materials such as a plastic-ferrite composite magnet (hereinafter often simply referred to as "plastic magnet").

Recently, there has been a strong desire for the improvement of performance characteristics of ferrite powders for use in ferrite-containing composite materials, such as; "plastic magnets". To meet with such strong desire, many investigations have been made in various fields of industry including an attempt to improve the characteristic properties of ferrite powder itself, a study of improving their miscibility with plastics or like materials for making composite products, a study for the purpose of developing improved ferrite powder which is easy to magnetize when placed in a magnetic field, and the like.

Heretofore, when plastic magnet was prepared from ferrite powder, the same type of ferrite powder as that for use in the production of "sintered ferrite" has been used as a raw material for the production of such "plastic magnet". An outline of the conventional method of preparing ferrite powder is given below, referring to one particular example illustrating the production of "barium ferrite".

First, ferric oxide ($Fe_2O_3$) and barium carbonate ($BaCO_3$), both in solid state, are mixed with each other according to the predetermined, desired molar ratio of the respective components, i.e. 2Fe/Ba. Then, the mixture is baked at a temperature within the range of 900°–1300° C., followed by grinding the baked product. In order to eliminate the strain caused by the mechanical grinding, the resulting powder is generally annealed at a temperature in the range of 800°–900° C. The ferrite powder thus obtained is now available as a raw material for the production of "plastic magnet".

The general requisites of a ferrite powder adapted for use in a "plastic magnet" include that the shape of the powder particle should be a hexagonal flat plate, which is the shape inherent in the hexagonal-system ferrite powder, that said flat plate should be as thin as possible, that the size of each crystal should be uniform, that the particle size should be within the range of 1.0–1.5 micron, and that the particle size distribution should preferably be as narrow as possible. The miscibility with a plastic material depends largely on the particle size of the ferrite powder, and the mean particle size within the range of around 1.5 micron seems to be the most suitable. In either of the cases wherein the ferrite particles are too much rougher, or alternatively too much finer than said range, the maximum amount of ferrite powder which can be admixed with plastic material decreases. Also from the viewpoint of easy magnetic orientation when placed in a magnetic field, ferrite crystals should preferably be in the form of flat plates, which can be realized by predominant crystal growth occurring in the direction of the A-axis of the hexagonal-system crystal and thereby the particles are thin in the direction of "the easily magnetizable axis" (the C-axis). We have made much effort to find out how we can produce ferrite powder satisfying such requisites as mentioned above and at last have developed the below mentioned process for the production of such ferrite powder. One embodiment of the process of the present invention particularly referring to the case producing barium ferrite is given below only for illustrative purposes.

Relatively fine particles of iron oxide ($\alpha$-$Fe_2O_3$), particularly those having an average particle size in the range of 0.5–1.0 micron were used as a raw material and they were admixed with barium carbonate ($BaCO_3$) in the predetermined molar ratio (n=2Fe/Ba=5.1–5.8). At the same time, a mixed additive comprising a mixture of (a) X-agent consisting of one or two or more members selected from chlorides of alkali metals (KCl, NaCl, LiCl) and (b) Y-agent consisting of one or two or more members selected from metaborates of alkali metals ($NaBO_2$, $KBO_2$, $LiBO_2$) and carbonates of alkali metals ($Na_2CO_3$, $K_2CO_3$, $Li_2CO_3$) was prepared by mixing X-agent and Y-agent in the ratio of 1:0.2–0.3. Then, the mixed additive thus obtained comprising said X- and Y-agents was mixed with a ferrite-forming raw material comprising iron oxide in such a manner that the proportion of the total amount of said mixed additive based on the amount of the ferrite powder as a final product might be in the range of 5–20% by weight, and then the final mixture thus obtained was baked. The temperature of baking may vary depending on factors such as the ratio of components, the amount of the mixed additive to be used and the like. However, the baking is generally carried out with temperatures rising at a rate of 100°–300° C./Hr, preferably at a rate of 120°–150° C./Hr followed by holding the raw material at temperatures of 900°–1300° C. for 30 minutes or longer, preferably at 1000°–1200° C. for 1 hour. The baking is carried out in an open vessel with an appropriate or free ventilation. Even if the baking is carried out at temperatures in the range of 900°–1100° C., which is lower by about 100° C. than the baking temperature in the conventional solid phase baking reaction, the ferrite-forming reaction proceeds satisfactorily. The salts of alkali metals used as additives only contribute to accelerate the ferrite-forming reaction occurring between barium oxide and iron oxide. They do not affect the real structure of the resulting ferrite and exist outside of the crystal system of each particle of ferrite. In addition, since all of these salts are water-soluble, they can be removed completely in the step of disintegration if it is done by a wet process. If the disintegration is done by a dry process, they can be removed completely by simply washing the disintegrated product with water 1 or 2 times. The ferrite powder thus obtained can be adjusted to the desired particle size by simple disintegration instead of the mechanical pulverizing which is generally required for the ferrite product prepared by the conventonal dry process. In the conventional dry process, the baked product is subjected to mechanical pulverization to obtain the mean particle size of about 1 micron. Due to the impact distortion given to the particles in said pulverizing step, the coercive force ($_IH_C$) of the ferrite, which is one of the important magnetic properties thereof, is weakened significantly. Thus, it was essential in the conventional dry process to anneal the pulverized product at a temperature in the range of 800°–900° C. to eliminate the distortion and regain the desired coercive force ($_I H_C$). In contrast, in the process of the present invention it is unnecessary to anneal the disintegrated product for the purpose of regaining the coercive force considering the disadvantageous effect of the distortion to be caused by the disintegration treatment. However, it is desirable, though not necessary, to slightly anneal the disintegrated product of the baked ferrite in order to modify disadvantageous changes that appear on the crystal surfaces as a result of the disintegration treatment to improve the miscibility thereof with other mixing counterpart materials. The annealing for this purpose can be carried out at temperatures about 100° C. lower than the temperature of annealing generally used in the conventional dry process for the production of ferrite. The hexagonal-system ferrite powder thus obtained according to present invention has a crystal form which is very different from that of the ferrite powder prepared by the conventional dry process.

In the conventional dry process, the crystal form of the resulting ferrite generally depends largely on the temperature of baking. In contrast, in the process of the present invention, it is possible to change the crystal form of the resulting hexagonal-system ferrite by changing the ratio of one component selected from chlorides of alkali metals to another component selected from metaborates and/or carbonates of alkali metals. For example, in one case the crystal form may be roundish, while in another case the plate-like crystal form can be obtained as a result of permitting the preferential growth of crystal in the direction of A-axis (namely, in the direction perpendicular to the easily magnetizable axis).

One characteristic of the present invention consists in that the crystal form can be adjusted easily considering the desired use of the resulting ferrite powder. For example, if the ferrite is to be used in a ferrite composite containing a resin as a binder, and a product such as a card magnetic recorder is to be made therefrom by coating the ferrite-containing composite on a sheet of supporting material, it is appropriate to use the ferrite powder prepared by permitting equal degrees of crystal growth in the directions of both A-axis and C-axis and comprising the particles in the form of a roundish hexagon and having a narrow particle size distribution. If the ferrite is to be used as a raw material for the production of a plastic-ferrite composite magnet, it is appropriate to use the ferrite powder comprising particles in the crystal form of hexagonal flat plates, which is inherently suitable for applying to roll molding, injection molding and in-magnetic field-molding. Thus, the ferrite particles having the most suitable crystal forms for the respective uses can be obtained arbitrarily according to the process of the present invention.

In the following lines, the construction and the effect of the present invention will be described in detail. As already explained hereinbefore, the general process for the production of hexagonal-system ferrite (the explanation will be particularly referred to the production of barium-ferrite as one of the typical examples) comprises the step of mixing α-$Fe_2O_3$ and $BaCO_3$ based on the predetermined molar ratio and baking the resulting mixture at temperatures in the range of 1000°–1350° C. to form ferrite. The degree of crystal growth of the hexagonal-system ferrite attained in said baking step is one of the important factors which determines the characteristic properties of the magnetic material as an end product. The addition of a small amount of an additive selected from $SiO_2$, $Bi_2O_3$, PbO and the like to the ferrite-forming material in the step of baking for the purpose of improving the magnetic properties of the product has often been tried. However, it seems that no careful study has been made with respect to the relationship between the compounds used as additives and the degrees of crystal growth. Taking note of this point, we have studied, by conducting various experiments, about the process for obtaining ferrite powder which is excellent in any of the magnetic properties, miscibility and orientation properties when used in mixing with a resin material. In particular, the typical requisites for obtaining high performance ferrite powder suitable for use in a ferrite-containing composite include (1) that the coercive force ($_I H_C$) of the ferrite powder itself is large, (2) that the amount of the ferrite powder which can be mixed with the other component material (such as a resin) should be large, (3) that the natural orientation properties in the step of roll molding or the like should be good, and (4) that the powder should be easy to orient in a certain fixed direction when it is to be oriented in magnetic field. In the process of the present invention, at least one compound selected from chlorides of alkali metals (KCl, NaCl, LiCl) and at least one compound selected from metaborates of alkali metals ($NaBO_2$, $KBO_2$, $LiBO_2$) and carbonates of alkali metals ($Na_2CO_3$, $K_2CO_3$, $Li_2CO_3$) are used simultaneously in a varied ratio of mixing for obtaining ferrite powders which may satisfy the above mentioned requisites. It has been confirmed that this method is exceptionally effective for obtaining ferrite particles having ideal crystal form. The chloride of an alkali metal mentioned above may serve to accelerate the crystal growth in the direction of the C-axis, and if it is used in an appropriate amount, the crystal growth proceeds gradually in the directions of both A-axis and C-axis and as a result the ferrite particles in the form of hexagonal, roundish shape and having a narrow particle size distribution can be obtained. On the other hand, the metaborates or carbonates of alkali metals can accelerate the crystal growth in the direction of the A-axis significantly. Thus, the use of too much brings about a ferrite powder comprising a mixture of particles of large size. Namely, it is possible to control the size, thickness, ect., of the resulting crystals by changing the amounts and the mixing ratio of the respective additives such as chlorides, metaborates and carbonates of alkali metals. The effect of the present invention will be explained in more detail hereunder referring to one preferred embodiment thereof wherein KCl is selected as the "chloride of alkali metal" component and $NaBO_2$ is selected as the "metaborate of alkali metal" component for the production of the hexagonal-system ferrite having the formula: $BaO \cdot nFe_2O_3$ (n=5.6).

Raw materials, α-$Fe_2O_3$ and $BaCO_3$, both in solid state, were blended with each other so that the blend ratio (2Fe/Ba) became 5.6. To the resulting blend was added KCl and $NaBO_2$, either in solid state or in the form of an aqueous solution thereof. The amounts of KCl and $NaBO_2$ added were 8% by weight and 2% by weight, respectively. After fully mixing these components, the resulting powder itself was immediately placed in an electric muffle furnace or alternatively the powder was pelletized into pellets in the size of 5–7 m/m $\phi$ followed by drying the pellets and placing them in the electric muffle furnace. The powder or the pellets were baked in the furnace at 1050° C. or 1100° C. for 1 hour. The baked product appeared as crystal particles of clear crystal form. The product was subjected to disintegration treatment by using a dry-type ball mill for 30 minutes. The electron microscope photograph of the barium-ferrite powder thus obained is as shown in FIG. 1. In this connection, a brief explanation of the attached drawings will be given hereinbelow.

Figure 1:
FIG. 1 is an electron microscope photograph of the ferrite powder comprising hexagonal-system clear shaped plate-like crystal particles prepared by the process of the present invention.
Figure 2:
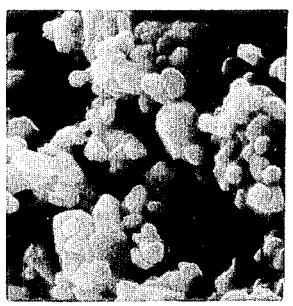
FIG. 2 is an electron microscope photograph of the ferrite powder comprising roundish crystal particles prepared according to the process of the present invention.
Figure 3:
FIG. 3 is an electron microscope photograph of the ferrite powder comprising crystal particles partly containing particles of abnormal crystal growth prepared by the process of the present invention.

As is obvious from the photograph of FIG. 1, the product powder comprises flat plate particles having the clear crystal form of the hexagonal-system ferrite. When the above mentioned process was repeated except that only $NaBO_2$ was added in an amount of 5% by weight to the raw material mixture, the formation of coarse grains is remarkably accelerated and abnormal crystal growth is observed. As a result, the magnetic properties, particularly coercive force, $(_IH_C)$ of the ferrite product is greatly decreased. The electron microscope photograph of said abnormal growth ferrite powder is as shown in FIG. 3. When the same process was carried out except that only KCl was added in an amount of 8% by weight, the rate of crystal growth was slow as already explained hereinbefore, and the electron microscope photograph of the crystal form is as shown in FIG. 2. The rate of crystal growth in this case was slower than the case when the same process was carried out but with no additives, and the resulting crystal particles were roundish as seen in the figure. Thus, by changing the blending ratio or the combination counterpart of the chlorides and metaborates of alkali metals, it is possible to control the crystal form of the resulting hexagonal-system ferrite. When only the chloride of alkali metal is added, the crystal growth of the ferrite cannot be accelerated so much by increasing the amount of addition or by increasing the baking temperature, and the crystal particles tend to become more and more roundish in shape. On the other hand, when only the metaborate or the carbonate is added, the rate of crystal growth is very high even if the baking is carried out at the same temperature as in the case when only the chloride of alkali metal was added. For example, if $NaBO_2$ is added in an amount of at least 2% by weight based on the amount of the resulting ferrite, the formation of coarse crystal particles is accelerated. As is evident from the above explanation, by the addition of only one of said two types of additives, it is not possible to obtain the ideal product of hexagonal-system ferrite particles having excellent magnetic properties. However, if the combination of these two types of additives in appropriate blending ratio is added in an appropriate amount, the ferrite particles of the desired crystal form can be obtained selectively. In the cases wherein KCl is selected as the chloride component and $NaBO_2$ as the metaborate component, the combination of KCl and $NaBO_2$ in the blending ratio of 1:0.2–0.3 is the most appropriate for the production of hexagonal-system ferrite powder that is the most suitable for use as a raw material for preparing a plastic-ferrite composite magnet.

If the amount of the Y-agent exceeds the above mentioned range, the crystal growth in the direction of A-axis proceeds at an abnormally high rate and the magnetic properties of the resulting ferrite, particularly the coercive force $(_IH_C)$ thereof, decreases remarkably. If the amount of Y-agent is less than said range, no remarkable change is observed. It is impossible to obtain ferrite particles having ideal, hexagonal and thin flat plate crystal form by the addition of only X-agent, whatever the amount thereof. Most preferably, the total amount of X-agent and Y-agent should be about 10% by weight based on the amount of the ferrite produced. If said total amount is less than 5% by weight, the crystal growth in the directions of A-axis and C-axis, particularly in the direction of A-axis, is slow and it is difficult to obtain ferrite particles having the desired hexagonal, thin plate crystal form. If said total amount is more than 20% by weight, there is some possibility of impairing the bricks of the baking furnace. It is true that neither chlorides of alkali metals nor metaborates thereof decompose at temperatures for the formation of ferrite. However, such is true when each of them is placed in the furnace singly. In the cases wherein other oxide materials co-exist, there is a possibility of causing secondary decomposition phenomena as a result of the mutual reaction with such materials. From this standpoint, too much of the additives should not be used. Thus, the maximum total amount of said two types of agent should be limited to 20% by weight. Namely, in order to limit the maximum amount of Y-agent, which is easy to decompose, to 5% by weight, it is necessary to limit the maximum of said total amount of X- and Y-agents to 20% by weight. Also from the viewpoint of economy and facilities preservation, the smaller the amounts of the additives, the better.

So long as it concerns the chlorides, metaborates and carbonates of alkali metals defined in this specification, those not actually shown in the specification are as equally effective as those actually shown by working examples herein. It has also been confirmed that the amount of such unshown salts to be used is also substantially the same as in the case of the shown salts. The temperature of baking varies, as already mentioned, depending on the ratio of components, the types of additives specifically used and the amounts thereof. Thus, it is difficult to specify the range of the temperature of baking. However, in order to obtain the most ideal crystal form of the hexagonal-system ferrite, the rate of rising temperature should be as low as possible. Preferably, the baking is carried out with temperatures rising at a rate of 120°–150° C./Hr until it reaches the treating temperature in the range of 1000°–1100° C., which is maintained for 1 hour. The hexagonal-system ferrite powder thus obtained has a saturation magnetization $(\rho_s)$ of 50–70 emu/g. Using this powder as a raw material in combination with a thermoplastic resin, a composite plastic-ferrite magnet was prepared. The proportion of ferrite powder was 85–90% by weight. In particular, as a thermoplastic resin component, chlorosulfonated polyethylene (trade name: "Hiparon 40" available from Du Pont), which is one of the chlorinated polyethylenes having good fluidity and good resistance to thermal decomposition, was used by mixing with said ferrite powder to obtain a mixture in which the proportion of said ferrite powder was 85–90% by weight. Then, the mixture was molded at 90° C. into a rolled sheet by a pressure roll for rubbers and resins (roll diameter 3"×roll width 6"). The rolled sheet was cut into pieces having a cross section 40 m/m square and the resulting pieces were piled within a metal frame to fill it. Then, the piled up pieces were compression molded at a hot press temperature of 120° C. and a compression pressure of 200 kg/cm² into a molded article 10-15 m/m thick. The laminated surfaces of the resulting molded article showed uniform structure which had been brought about by the coalescence of the softened thermoplastic resin. Thus, a "plastic magnet" was obtained in which ferrite powder particles were well oriented in the direction perpendicular to the direction of compression, namely in the direction of rolling.

In the following examples, a variety of performances of the baked ferrite powder depending on the varied combinations of respective X- and Y-agents will be explained. These examples are given for the purpose of merely illustrating some of the representative examples relating to the mixing ratio of X- and Y-agents and the proportion of the mixture of X- and Y-agents to the total weight of the final product, and by no means intend to limit the scope of the present invention to such mixing ratio or proportion. Thus, of course, it is necessary to change the mixing ratio and the proportion mentioned above depending on the characteristic properties of the ferrite powder specifically used as a raw material for obtaining ferrite by baking.

The degree of orientation given in the examples represents the ratio in percentage of the value of magnetic properties determined in the direction parallel to the direction in which the compression molded article was rolled (namely in the direction of C-axis of the ferrite powder oriented by the rolling) Br(I) to the value of magnetic properties determined in the direction perpendicular to the direction in which the compression pressure was given Br(II):

$$\text{The degree of orientation (\%)} = \frac{Br(I)}{Br(I) - Br(II)}$$

The invention will be further illustrated by the following examples.

EXAMPLE 1

In order to obtain the mixture wherein the ratio of main components ($Fe_2O_3/BaO$) is equal to 5.8, the necessary amounts of the respective component materials, ferric oxide and barium carbonate, were determined considering also the purities of the respective raw materials. Based on the determination thus made, 155.64 g of $Fe_2O_3$ and 33.41 g of $BaCO_3$ were weighed and mixed with each other. Then, based on the amount of $BaO.5.8Fe_2O_2$, the amount of potassium chloride corresponding to 8% by weight of said $BaO.5.8Fe_2O_3$ and the amount of sodium metaborate corresponding to 2% by weight of said $BaO.5.8Fe_2O_3$ were determined, respectively. Then, considering the purities of the respective components, 16.16 g of KCl and 8.47 g of $NaBO_2.4H_2O$ were actually weighed and added to said mixture of $Fe_2O_3$ and $BaCO_3$. The resulting composition was well mixed in a dry-type ball mill for about 1 hour and then was baked in a free ventilation type electric muffle furnace at 1050° C. for 1 hour. A 202 g portion of the baked product was taken as a sample and was mixed with water to provide a pulp having a solids concentration of about 50%. The pulp was placed in the same ball mill as used for mixing and was subjected to the wet-process disintegration treatment for about 30 minutes. The sample after this treatment comprised particles having an average particle size of 1.3 micron.

The unreacted portions of the additives remaining in the product ferrite can be completely removed from the ferrite system by dewatering the pulp after said wet-process disintegration. The hexagonal-system ferrite powder particles thus obtained have very clear crystal form in the shape of hexagonal thin flat plate resulting from the predominant crystal growth in the direction of A-axis. FIG. 1 shows an electron microscope photograph of these particles. These hexagonal-system ferrite powder particles have almost no strain because they have been treated only by the very mild disintegration process by the wet-process ball mill instead of the mechanical crushing by a machine accompanying a great impact shock such as, for example, a vibration ball mill. Accordingly, the additional treatment of annealing for the purpose of recovering the coercive force ($_IH_C$) is not required in the process of the present invention. The ferrite particles of the present invention have ideal crystal form as a raw material for preparing a plastic-ferrite composite magnet. The saturation magnetization ($p_s$) of the barium-ferrite powder thus obtained was 69 emu/g. The magnetic properties of the plastic-ferrite composite magnet prepared by using said powder as a raw material in combination with a thermoplastic resin, wherein the proportion of the ferrite powder was 88%, were as given below.

|  | Br (G) | $_BH_{C (Oe)}$ | $_IH_{C (Oe)}$ | (M G Oe) (BH)$_{max}$ | degree of orientation |
|---|---|---|---|---|---|
| product by the process of the present invention | 2410 | 2150 | 2730 | 1.71 | 81.3 |

In contrast, a magnetic properties of the similar plastic-ferrite composite magnet prepared in the same manner as mentioned above except that a ferrite powder prepared by the conventional dry process was used instead of the ferrite powder of the present invention were as follows.

|  | Br (G) | $_BH_{C (Oe)}$ | $_IH_{C (Oe)}$ | (BH)$_{max}$ | degree of orientation (%) |
|---|---|---|---|---|---|
| product by the process of the prior art | 2160 | 1830 | 2460 | 1.09 | 67.5 |

As is obvious from the above comparison, the plastic magnet prepared by using the ferrite powder of the present invention showed a degree of orientation of as much as more than 80%, although the plastic magnet had been prepared under the condition of natural orientation in the process of molding instead of forced orientation such as by molding in the magnetic field. This is because the ferrite particles of the present invention have the clear crystal form of hexagonal flat plates as demonstrated by the electron microscope photograph shown in FIG. 1, which is the convenient shape for being provided with anisotropy. Namely, the ferrite powder of the present invention is considered to be the most suitable for preparing a plastic-ferrite composite magnet.

EXAMPLE 2

In order to obtain the mixture wherein the ratio of main components ($Fe_2O_3/BaO$) is equal to 5.6, the necessary amounts of the respective component materials, ferric oxide and barium carbonate, were determined considering also the purities of the respective raw materials. Then, as necessary amounts, 158.98 g of $\alpha.Fe_2O_3$ and 35.19 g of $BaCO_3$ were weighed and mixed with each other. Then, based on the weight of the component corresponding to $BaO.5.6Fe_2O_3$, 8% by weight (which is actually 16.16 g) of potassium chloride (KCl) was added to said mixture of $\alpha.Fe_2O_3$ and $BaCO_3$. The final mixture was well mixed in a dry-type ball mill for about 1 hour. Then, the resulting mixture was placed in a free ventilation electric muffle furnace and baked at 1100° C. for 1 hour. A 200 g portion of the baked product was taken as a sample, and the sample was treated in the same manner as in Example 1 including the steps of wet disintegration and dewatering filtration treatment. After all these treatments, the particles of the ferrite powder had a mean particle size of 1.3 micron. The hexagonal-system ferrite powder particles thus obtained has a roundish crystal form as shown by the electron microscope photograph in FIG. 2 wherein the degree of crystal growth in the directions of both A-axis and C-axis were almost the same. The saturation magnetization ($\rho_s$) of this barium-ferrite was 57 emu/g. A plastic-ferrite composite magnet was prepared using this ferrite powder in the same manner as in Example 1. The proportion of the ferrite powder in the plastic magnet was 88% by weight. The magnetic properties of this plastic magnet were as given below. The hexagonal-system ferrite powder having such crystal form as this is suitable as a magnetic powder for coating on various types of sheet to make a material such as a magnetic recording card.

| Br (G) | $_BH_C$ (Oe) | $_IH_C$ (Oe) | (BH)$_{max}$ | Degree of orientation (%) |
|---|---|---|---|---|
| 2050 | 1880 | 2300 | 1.07 | 71.0 |

EXAMPLE 3

In order to obtain a mixture wherein the ratio of main components (n=$Fe_2O_3/BaO$) was equal to 5.8, the necessary amounts of the respective components were determined considering also the purities of the components. Then, as necessary amounts, 164.29 g of $\alpha.Fe_2O_3$ and 35.27 g of $BaCO_3$ were weighed and mixed. Then, based on the amount of the major component corresponding to $BaO.5.8Fe_2O_3$, 5% by weight of sodium metaborate (actually, 21.16 g of $NaBO_2.4H_2O$) was weighed and added to said mixture of $\alpha.Fe_2O_3$ and $BaCO_3$. The final mixture was mixed well in a dry-type ball mill for about 1 hour, and then the resulting mixture was baked in a free ventilation type electric muffle furnace at 1050° C. for 1 hour. About 200 g of the baked product was treated in the same manner as in Examples 1 and 2 and as a result barium-ferrite powder having a mean particle size of 2.4 micron was obtained. This ferrite powder had a crystal form as shown by the electron microscope photograph in FIG. 3. As is obvious from the figure, the hexagonal-system ferrite powder particles thus obtained were very coarse as a result of abnormal crystal growth in the directions of both A-axis and C-axis. As seen in this example, the addition of only a basic flux results in the production of very coarse ferrite particles and the coercive force ($_IH_C$) of the ferrite is greatly decreased. The magnetic properties of the plastic-ferrite composite magnet prepared from this ferrite powder in the same manner as in Example 1 were as follows. The saturation magnetization ($\rho_s$) of the ferrite powder used as the raw material was 536 emu/g and the proportion of the ferrite powder in the resulting plastic magnet was 88% by weight.

| Br (G) | $_BH_C$ (Oe) | $_IH_C$ (Oe) | (BH)$_{max}$ | Degree of orientation (%) |
|---|---|---|---|---|
| 1980 | 1630 | 2010 | 0.93 | 67.0 |

EXAMPLE 4

In order to obtain a mixture wherein the ratio of main components ($Fe_2O_3/BaO$) is equal to 5.8, the necessary amounts of the respective components, ferric oxide and barium carbonate, were determined considering also the purities of the respective raw materials. Then, as necessary amounts, 155.64 g of a $\alpha.Fe_2O_3$ and 33.41 g of $BaCO_3$ were weighed and mixed. Then, based on the weight of the component corresponding to $BaO.5.8Fe_2O_3$, 5% by weight of potassium chloride and 5% by weight of sodium metaborate (actually, 10.10 g of KCl and 21.16 g of $NaBO_2.4H_2O$) were added to the mixture of $\alpha.Fe_2O_3$ and $BaCO_3$. The final mixture was well mixed in a dry type ball mill for about 1 hour and then was baked in a free ventilation type electric muffle furnace at 1050° C. for 1 hour. About 200 g portion of the baked product was disintegrated in the same manner as in Example 1 to obtain the barium-ferrite particles having a mean particle size of 1.8 micron. The observation with an electron microscope revealed that each particle had a relatively clear shape and the crystal growth was conspicuous in the direction of thickness (C-axis). The hexagonal-system crystal particle thus obtained was about twice as thick as that of the particle obtained in Example 1 as a result of the predominant crystal growth in this direction. Using this powder as a raw material, a plastic-ferrite composite magnet was prepared in the same manner as in Example 1. The saturation magnetization ($\sigma_s$) of barium-ferrite used as the raw material was 645 emu/g and its proportion in the composite magnet was 88% by weight. The magnetic properties of the resulting composite magnet were as follows.

| Br (G) | $_BH_C$ (Oe) | $_IH_C$ (Oe) | (BH)$_{max}$ | Dregree of orientation (%) |
|---|---|---|---|---|
| 2290 | 1970 | 2510 | 1.24 | 78.3 |

EXAMPLE 5

In order to obtain the mixture wherein the molar ratio of main components (n=$Fe_2O_3/BaO$) was equal to 5.8, the necessary amounts of the respective components were determined considering also the purities of the components. Then, as necessary amounts, 155.64 g of $\alpha.Fe_2O_3$ and 33.41 g of $BaCO_3$ were weighed and mixed. Then, based on the amount of $BaO.5.8Fe_2O_3$ contained in the resulting mixture, 2% by weight of potassium chloride (actually, 4.04 g of KCl) and 8% by weight of sodium metaborate (actually, 33.86 g of NaBO$_2$.4H$_2$O) were added to the mixture. The final mixture was mixed well in a dry-type ball mill for about 1 hour and then was baked in a free ventilation type electric muffle furnace at 1050° C. for 1 hour. A 200 g portion of the resulting baked product was treated in the same manner as in Example 1 to provide barium-ferrite powder having a mean particle size of 2.7 micron. It was confirmed by the electron microscope photograph that the powder particles thus obtained has a crystal structure wherein the crystal growth in the direction of A-axis is conspicuous. The saturation magnetization ($\sigma_s$) of this powder was 59.3 emu/g. Next, a plastic-ferrite composite magnet was prepared using this powder as a raw material and the magnetic properties of the resulting magnet were determined. The results were as follows. The proportion of the ferrite powder mixed therein was 88% by weight.

| Br (G) | $_B$H$_C$ (Oe) | $_I$H$_C$ (Oe) | (BH)$_{max}$ | Degree of orientation (%) |
|---|---|---|---|---|
| 2150 | 1860 | 2100 | 1.02 | 73.2 |

EXAMPLE 6

In order to obtain a mixture wherein the molar ratio of main components (Fe$_2$O$_3$/BaO) is equal to 5.4, the necessary amounts of the respective components, ferric oxide and barium carbonate, were determined considering the purities of the respective components. Then, as necessary amounts, 157.44 g of α.Fe$_2$O$_3$ and 36.30 g of BaCO$_3$ were weighed to be mixed. Then, based on the amount of BaO.5.4Fe$_2$O$_3$ contained in the resulting mixture, 6% by weight of sodium chloride (or 12.24 g as an actual weight) and 2% by weight of sodium carbonate (or 4.04 g of Na$_2$CO$_3$ as an actual amount) were added to said mixture and the resulting mixture was mixed well in a dry-type ball mill for about 1 hour and then was baked in a free ventilation type electric muffle furnace at 1050° C. for 1 hour to obtain about 200 g of baked product. By treating the baked product in the same manner as in Example 1, barium-ferrite powder comprising clear shape particles having a mean particle size of 1.4 micron was obtained. It was observed with the electron microscope that the ferrite powder comprised the crystal particles in the shape of hexagonal thin plate resulting from the predominant crystal growth in the direction of A-axis. The saturation magnetization ($\sigma_s$) of the ferrite powder obtained by merely disintegrating the baked product without annealing treatment was 67 emu/g. The magnetic properties of the plastic-ferrite composite magnet prepared by mixing said powder with a thermoplastic resin so as to make the proportion of ferrite powder in the composite magnet 88% by weight were as follows.

| Br (G) | $_B$H$_C$ (Oe) | $_I$H$_C$ (Oe) | (BH)$_{max}$ | Degree of orientation (%) |
|---|---|---|---|---|
| 2380 | 2060 | 2650 | 1.45 | 80.0 |

EXAMPLE 7

In order to obtain a mixture wherein the molar ratio of main components (Fe$_2$O$_3$/SrO) is equal to 5.6, the necessary amounts of the respective components, ferric oxide and strontium oxide, were determined considering the purities of the respective components. Then, as necessary amounts, 162.57 g of α.Fe$_2$O$_3$ and 27.45 g of SrCO$_3$ were weighed, respectively, to be mixed. Then, based on the amount of SrO.5.6Fe$_2$O$_3$ contained in the resulting mixture, 8% by weight of potassium chloride (in particular, 16.16 g of KCl) and 2% by weight of sodium metaborate (in particular, 8.47 g of NaBO$_2$.4H$_2$O) were added to said mixture, followed by well mixing in a dry-type ball mill for about 1 hour. Then, the final mixture was baked in a free ventilation type electric muffle furnace at 1000° C. for 1 hour. About 202 g of the baked product was mixed with water to provide a pulp having solids content of about 50%. The pulp was treated for disintegration in a ball mill for about 30 minutes in the same manner as in the case of barium-ferrite. The mean particle size of the resulting powder was 1.2 micron. The particle shape of the resulting ferrite powder was hexagonal thin plate having the predominant crystals growth in the direction of A-axis. The saturation magnetization ($\sigma_s$) of this strontium-ferrite was 65 emu/g. A plastic-ferrite composite magnet was prepared by using said strontium-ferrite powder as a raw material to be mixed with a resin. The proportion of the ferrite powder in the resulting composite magnet was 88% by weight. The magnetic properties thereof are as follows.

| Br (G) | $_B$H$_C$ (Oe) | $_I$H$_C$ (Oe) | (BH)$_{max}$ | Degree of orientation (%) |
|---|---|---|---|---|
| 2010 | 2530 | 2980 | 1.38 | 79.7 |

EXAMPLE 8

In order to obtain a mixture wherein the molar ratio of main components (n=Fe$_2$O$_3$/SrO) is equal to 5.8, the necessary amounts of the respective components, ferric oxide and strontium carbonate, were determined considering the purities of the respective components. Then, as necessary amounts, 167.69 g of α.Fe$_2$O$_3$ and 27.34 g of SrCO$_3$ were weighed, respectively, and mixed. Then, based on the amount of SrO.5.8 Fe$_2$O$_3$ contained in the resulting mixture, 6% by weight of potassium chloride (in particular 12.12 g of KCl) and 2% by weight of sodium carbonate (in particular, 4.04 g of Na$_2$CO$_3$) were added to the resulting mixture. Then, the final mixture was mixed well in a dry-type ball mill for about 1 hour. Then, the mixture was placed in a free ventilation type electric muffle furnace to be baked therein at 1100° C. for 1 hour. About 200 g of the baked product was disintegrated in the same manner as in Example 7 to obtain the powder having a mean particle size of 1.4 micron. When observed with the electron microscope, the crystal particle was in the shape of hexagonal thin plate as a result of the predominant crystal growth in the direction of A-axis. The saturation magnetization of the ferrite powder obtained by the mere disintegration without annealing treatment was 63 emu/g. The magnetic properties of the plastic-ferrite composite magnet prepared by using this ferrite powder in the proportion of 88% were as follows.

| Br (G) | $_B$H$_C$ (Oe) | $_I$H$_C$ (Oe) | (BH)$_{max}$ | Degree of orientation (%) |
|---|---|---|---|---|
| 1970 | 2200 | 2710 | 1.15 | 74.1 |

We claim:

1. A dry process for the production of hexagonal-system ferrite having the generic formula:

$$M \cdot nFe_2O_3$$

wherein n represents a number in the range of 5.1–5.8 inclusive; and M represents at least one metallic element selected from the group consisting of Ba, Sr and Pb, said process consisting essentially of the steps of:
  (a) forming a mixed additive of X-agent and Y-agent, wherein said X-agent is at least one chloride of alkaline metal selected from the group consisting of KCl, NACl and LiCl, and said Y-agent is at least one metaborate of alkali metal selected from the group consisting of $KBO_2$, $NaBO_2$, and $LiBO_2$ or at least one carbonate of alkali metal selected from the group consisting of $K_2CO_3$, $Na_2CO_3$ and $Li_2CO_3$ or a mixture of at least one of said metaborate and at least one of said carbonate, the ratio of X-agent to Y-agent depending on the desired axial ratio of A-axis to C-axis of the intended ferrite and being 1:02–about 1;
  (b) adding the mixed additive of said X- and Y-agents prepared according to said predetermined ratio to a ferrite-forming unbaked raw material composition comprising an iron oxide powder and a metal compound powder, said metal being at least one of Ba, Sr and Pb, in a manner such that the total amount of said mixed additive comprised 5–20% by weight of the final ferrite product;
  (c) baking within a temperature range of 900°–1300° C. the mixture of said mixed additive and unbaked raw material composition so as to form a ferrite; and
  removing substantially all of said mixed additive from the resulting ferrite by treating it with wet-process disintegration, which consists of disintegrating the ferrite in water and dewatering the disintegrating ferrite, or, alternatively, with dry-process disintegration and washing with water followed by drying.

2. The process as defined in claim 1 wherein the final mixture of said ferrite-forming raw material composition and said mixed additive is baked in the state of mixed powder followed by disintegrating the baked product by wet-process disintegration.

3. The process as defined in claim 1 wherein said final mixture comprising said ferrite-forming raw material composition and said mixed additive is pelletized before it is baked, and then the baked product is crushed and disintegrated by wet process.

4. The process as defined in claim 3 wherein at least part of said mixed additive is dissolved in water for use in pelletizing instead of mixing it in solid state with said ferrite-forming unbaked raw material composition.

5. The process as defined in any one of claims 1–4 wherein said mixed additive is prepared by blending 100 parts by weight of X-agent with 20–30 parts by weight of Y-agent in order to obtain crystal particles having a small axial ratio of A-axis to C-axis, the proportion of said mixed additive based on the amount of the final ferrite product being 5–20% by weight, the ferrite powder obtained by said process comprising relatively uniform crystal particles in the shape of hexagonal flat plates, and having superior miscibility with blending components comprising various resins or rubbers, said particles showing superior orientation properties along a certain fixed direction when molded by roll or molded in a magnetic field.

6. The process as defined in any one of claims 1–4 wherein the total amount of X-agent and Y-agent is in the range of 5–10% by weight based on the amount of the final ferrite product.

7. The process as defined in any one of claims 1–4 wherein the step of disintegration is carried out by dry-process disintegration followed by washing, filtering and drying.

8. The process as defined in any one of claims 1–4 wherein the disintegrated ferrite powder which has been disintegrated by wet-process or the disintegrated ferrite powder which has been disintegrated by dry-process including crushing as a pretreatment followed by washing and filtering is optionally dried and then is subjected to annealing treatment at a temperature in the range of 800°–900° C., said annealing being carried out for the purpose of eliminating slight strain produced with the ferrite particles as a result of said disintegration treatment.

9. The process as defined in any one of claims 1–4 wherein the mixing ratio of X-agent to Y-agent is 1:0.2–0.3.

10. The process as defined in any one of claims 1–4 wherein the disintegrated ferrite powder which has been disintegrated by wet-process or the disintegrated ferrite powder, which has been disintegrated by dry process including crushing as a pretreatment followed by washing and filtering, is optionally dried and then is subjected to annealing treatment at a temperature in the range of 700°–800° C., said annealing being carried out for the purpose of eliminating slight strain produced with the ferrite particles as a result of said disintegration treatment.

* * * * *